United States Patent
Hosokawa et al.

[11] Patent Number: 5,932,634
[45] Date of Patent: Aug. 3, 1999

[54] METHOD OF PRODUCING RESIN COMPOSITION CONTAINING INORGANIC FILLER

[75] Inventors: Teruo Hosokawa; Hirofumi Inoue; Yoshihiro Moteki, all of Kawasaki, Japan

[73] Assignee: Showa Denko K.K., Tokyo, Japan

[21] Appl. No.: 08/836,913

[22] PCT Filed: Sep. 25, 1996

[86] PCT No.: PCT/JP96/02754

§ 371 Date: May 23, 1997

§ 102(e) Date: May 23, 1997

[87] PCT Pub. No.: WO97/11998

PCT Pub. Date: Apr. 3, 1997

[30] Foreign Application Priority Data

Sep. 26, 1995 [JP] Japan ..................... 7-248168

[51] Int. Cl.$^6$ ............... C08K 9/04; C08K 3/34; C08K 3/10
[52] U.S. Cl. ............... 523/209; 523/216; 524/445; 524/446; 524/447; 524/449; 524/451; 524/413
[58] Field of Search ..................... 523/209, 216; 524/445, 446, 447, 449, 451, 413

[56] References Cited

U.S. PATENT DOCUMENTS

| | | | |
|---|---|---|---|
| 4,412,018 | 10/1983 | Finlayson et al. | 524/445 |
| 4,472,538 | 9/1984 | Kamigaito et al. | 523/209 |
| 4,739,007 | 4/1988 | Okada et al. | 523/216 |
| 4,810,734 | 3/1989 | Kawasumi et al. | 523/216 |
| 4,889,885 | 12/1989 | Usuki et al. | 524/449 |
| 5,102,948 | 4/1992 | Deguchi et al. | 524/789 |
| 5,514,734 | 5/1996 | Maxfield et al. | 524/445 |
| 5,530,052 | 6/1996 | Takekoshi et al. | 524/447 |
| 5,552,469 | 9/1996 | Beall et al. | 524/446 |
| 5,578,672 | 11/1996 | Beall et al. | 524/446 |

FOREIGN PATENT DOCUMENTS

| | | | |
|---|---|---|---|
| 0 398 557 | 5/1990 | European Pat. Off. | C08K 3/34 |
| 52-111945 | 9/1977 | Japan | C08K 9/04 |
| 63-230766 | 9/1988 | Japan . | |
| 2102261 | 4/1990 | Japan . | |
| 2105856 | 4/1990 | Japan . | |
| 2-305828 | 12/1990 | Japan | C08J 5/18 |
| 770357 | 3/1995 | Japan . | |
| 8302025 | 11/1996 | Japan . | |
| 8302062 | 11/1996 | Japan . | |

*Primary Examiner*—Peter A. Szekely
*Attorney, Agent, or Firm*—Sughrue, Mion, Zinn, Macpeak & Seas, PLLC

[57] ABSTRACT

A method of producing a resin composition containing an inorganic filler is disclosed, wherein organic cations having a steric hindrance structure are brought into contact with a layered mineral with an equivalent area per unit charge on the layer surface of 40–150 Å$^2$/charge, then brought into contact with a thermoplastic resin having a solubility parameter of at least 9.5 $[cal/cm^3]^{1/2}$, so as to disperse the layered mineral inside the resin at the molecular level. The resin compositions obtained by this production method have excellent rigidity, heat resistance and impact resistance, and are suitable for use in fields such as, for example, automobiles, household electronic parts, construction materials and industrial materials.

7 Claims, No Drawings

5,932,634

METHOD OF PRODUCING RESIN COMPOSITION CONTAINING INORGANIC FILLER

TECHNICAL FIELD

The present invention relates to a resin composition with exceptional heat resistance, rigidity and impact resistance, suitable for use in fields such as automobiles, household electronics parts, construction materials and industrial materials.

BACKGROUND ART

Resin compositions having high mechanical strength are required in a variety of fields. Therefore, the rigidity, heat resistance and impact resistance of resins have been improved by the dispersion of inorganic fillers as filling materials. In particular, many attempts at increasing the mechanical properties and heat resistance of macromolecular materials by means of the dispersion of fillers on the nano-level have been made.

For example, a method has been proposed of intercalating (inserting) a monomer which is a source for a macromolecular material between the layers of a layered clay mineral, then dispersing the layered clay mineral on the nano-level by applying energy when polymerizing the monomer (for example, see Japanese Patent Application, First Publication No. Hei2-102261 and Japanese Patent Application, First Publication No. Hei2-105856). Additionally, a method has been tested of pre-swelling a layered clay mineral with organic cations, then further performing unlimited swelling with an organic solvent so that the layered clay mineral takes the form of a cardhouse, then bringing this into contact with a polymer melt in order to disperse the layered clay minerals on the nano-level (Japanese Patent Application, First Publication No. Hei 7-70357).

However, of the above-mentioned methods, while the former which is due to polymerization efficiently disperses the filler, it requires equipment for polymerization, so that the production costs are high and cannot be considered to be economical. Additionally, at present, the reaction is restricted to condensation polymerization employed for polyamides, aromatic polyesters and the like, radical polymerization wherein reactive monomers such as heat-hardening types are entered between the layers, or cationic polymerization and the like.

Additionally, since the monomers inserted between the layers must stably exist within the layers, those which are gases at standard pressure are not suitable, so as to be restricted to liquid monomers.

Therefore, there is the drawback that only limited resin material and a low-concentration filler can be obtained when obtaining a resin composition dispersed with fillers on the angstrom-level.

As a result, it is not possible to use, for example, anionic coordination polymerization used for polyolefins. That is, if active hydrogens such as amino acids exist between the layers of the layered clay mineral, they act as a catalyst poison in titanium/organic aluminum anion coordination catalysis.

Additionally, with this method which is due to polymerization, the clay minerals react with amino groups when polyamide monomers are inserted between the layers, so that the terminal groups of the polyamides form carboxylic acids after polymerization. For this reason, the reactivity of the terminal groups is sealed off, and there is a marked reduction in the dye-affinity and adhesive property. Additionally, when forming a polymer alloy with other resins, there are problems in that the adhesive property at the interface is poor even if a compatibility agent has been added, as a result of which the dispersive phase tends to easily un-mix and the capabilities become difficult to activate. As a measure for improvement on this problem, a method has been proposed of adding polyhydric amines afterwards, in order to induce a reaction with the terminal groups of the polyamides (Japanese Patent Application, First Publication No. Sho 63-230766).

However, there are disadvantages in that it is difficult to induce a uniform reaction because a reaction cannot be performed in a dilute solvent, and in that intermolecular crosslinking is encouraged so that reductions in the fluidity and moldability are likely to occur. Similarly, in the case of polyesters, di-alcohols of the monomers become coordinated in the layered clay minerals, thus increasing the number of carboxylic acids at the terminals when performing macromolecularization. Therefore, when forming a polymer alloy with polycarbonates, ABS, PBT and the like, there are problems in that the adhesive property at the interface is poor even if a lot of compatibility agent is added, and consequently de-bonding tends to occur, thereby making the capabilities difficult to activate.

Additionally, the latter method of using an organic solvent requires the use of large quantities of solvent on the layered clay mineral, as described in the publication. Furthermore, the degree of dissolution in organic solvents can be extremely poor for some polymers, and there are those wherein a layered mineral on which unlimited swelling has been performed cannot form a solid solution in the polymer. These types have extremely low affinities with respect to the solvent even if the resin is melted. Consequently, even if a clay mineral with unlimited swelling which has been pre-formulated by an organic cationic treatment is brought into contact with the polymer in a melted state, it does not easily disperse or mix, and does not achieve complete dispersion.

Additionally, even if an interlayer compound obtained by bringing an organic cation into contact with a layered mineral is brought into a state of unlimited swelling by an organic solvent, there is a tendency to return from the state of unlimited swelling to the original swollen state because the organic solvent partially evaporates due to the heat in the extruder during the process of contact with the melted resin. For this reason, in actuality, the contact with the melted polymer occurs at a step wherein the interlayer distance is contracted, thus making it difficult to obtain a complete dispersion.

Here, if an amorphous resin is used as the resin and is combined with an organic solvent with a high affinity with respect to this resin, then the above-mentioned production process can achieve dispersion albeit incomplete, but it is extremely difficult to achieve good dispersion when a crystal material is used as the resin. For this reason, countermeasures have been taken by improving the extrusion apparatus so as to make the contact time longer by employing extruders wherein the ratio (L/D) between the screw length (L) and the screw diameter (D) is 45 or more, and by using a batched kneader such as a banbury mixer, but the throughput by extrusion is markedly reduced due to the difficulty of removing the solvent, thus making these deficient in terms of their economical viability.

DISCLOSURE OF THE INVENTION

The present invention has the object of offering a method for producing resin compositions containing inorganic fillers having exceptional rigidity, heat resistance and impact resistance, by means of finely dispersing inorganic fillers at the nano-level directly into resin compositions.

The present invention offers a method of producing a resin composition containing an inorganic filler, characterized in that an organic cation having a steric hindrance structure is brought into contact with a layered mineral with an equivalent area per unit charge on the layer surface of 40–150 $\text{Å}^2$/charge, then brought into contact with a thermoplastic resin having a solubility parameter of at least 9.5 $[\text{cal/cm}^3]^{1/2}$, so as to disperse the layered mineral inside the resin at the molecular level.

Additionally, the present invention offers a method of producing a resin composition containing an inorganic filler, wherein the layered mineral dispersed in the resin has the following properties (a) and (b):

(a) thickness: 9–80 Å;

(b) at least 30% by weight having an aspect ratio of at least 300.

Additionally, the present invention offers a method of producing a resin composition containing an inorganic filler, wherein the organic cation is a salt of an azabicyclo compound or a derivative thereof.

Additionally, the present invention offers a method of producing a resin composition containing an inorganic filler, wherein a tri- or tetra-alkyl ammonium salt of a chain-type amine compound is also used as an organic cation.

BEST MODES FOR CARRYING OUT THE INVENTION

The present invention is described in detail below.

The method of producing a resin composition containing inorganic fillers according to the present invention involves bringing a specified organic cation into contact with a layered mineral in order to insert the organic cation inside the layers and swelling by expanding the interlayer distance, then kneading this with a specified thermoplastic resin to perform contact dispersion with the melted polymer.

The method of the present invention has the following advantages when compared with conventional methods.

First, with the method of producing a resin composition containing inorganic fillers according to the present invention, there is no need for measures to deal with sealing of the terminal groups such as are required for polymerization methods.

Furthermore, while organic solvents have been required in order to directly disperse layered minerals into the polymer until now, the method of the present invention does not require any processes for activating the organic solvent because there is no need for a solvent.

In the method of producing a resin composition containing inorganic fillers according to the present invention, an interlayer compound is first produced in the layered mineral by adding an organic cation having a steric hindrance structure.

Clay minerals are mainly used as the layered mineral used in the present invention, examples of which include swelling clay compounds, zirconium phosphate and the like.

Additionally, as examples of the layered mineral in the present invention, those satisfying the following rational formula are used.

$$M^{n+}(x+y+z)/n\{(M_{e1}{}^+M_{e2}{}^{+2}M_{e3}{}^{+3})_{z-3}{}^{(6-x)+}(OH_{2-z}O_z(Si_{4-y}Al_y)O_{10}\}^{(x+y+z)}$$

(x+y+z); silicate layer charge

M is an exchangeable metal ion between layers, and is at least one cation selected from the group consisting of alkali metal ions and alkali earth metal ions. Examples include Li, Na, K, Be, Mg, Ca and the like.

$M_{e1}{}^+$, $M_{e2}{}^{+2}$ and $M_{e3}{}^{+3}$ are either respectively single or consist of combinations of a plurality of $M_{e1}$, $M_{e2}$ and $M_{e3}$, and are cations which enter into octahedrons formed within smectite or mica structures, wherein $M_{e1}$ is Li, Na or K, $M_{e2}$ is Mg, Fe, Mn, Ni or Zn, and $M_{e3}$ is Al, Fe, Mn or Cr.

As examples of layered minerals, vermiculite, swellable mica, smectite minerals and the like can be given.

Additionally, montmorillonite, vermiculite and the like can be expressed by the following rational formula.

$$Na_x(A_{2-x}Mg_x)(Si_4O_{10})(OH)_2$$

Specifically, a product synthesized by Kunimine Kogyo K. K. is expressed by the following rational formula.

$$Na_{0.83}(Mg_3)[Si_{3.575}Al_{0.415}]O_{10}](OH)_2$$

Additionally, as an example of a fluorine-type swelling mica, there is tetrasilicic mica of TOPY INDUSTRIES, LIMITED, the rational formula of which is:

$$NaMg_{2.5}(Si_4O_{10})F_2$$

As an example of sodium taeniolite, there is that expressed by the rational formula:

$$NaMg_2Li(Si_4O_{10})F_2$$

In the present invention, the equivalent area (hereinafter referred to as "Ae") per unit charge in the layer surfaces of the above-mentioned layered mineral must be within the range of 40–150 $\text{Å}^2$/charge, preferably 40–80 $\text{Å}^2$/charge, and more preferably 40–60 $\text{Å}^2$/charge.

If Ae exceeds 150 $\text{Å}^2$/charge, it becomes difficult to achieve a conformational environment wherein the organic cations are dense, as a result of which the influence of the van der Waals force which pulls together adjacent electrical charges between layers can no longer be ignored, so that the dispersion is poor and the mechanical strength is deficient unless large quantities of organic cations are present. On the other hand, if Ae is less than 40 $\text{Å}^2$/charge, the crystals of the above-given rational formulas do not exist.

The Ae of the layered mineral is calculated by measuring the cation exchange capacity (CEC) by a column penetration process ("Clay Handbook" 2nd Ed., Japanese Clay Society, pp. 576–577, Gihodo Publishing), then determining the lattice constant from the results of a structural analysis by means of electron beam diffraction using a transmission-type electron microscope and a structural analysis by means of a Liebert process of powder X-ray analysis, and taking the reciprocal of the charge of the interlayer ions present per unit of lattice based on the above results, according to the following formula.

$$Ae = d(100) \times d(010)/2(x+y+z)$$

Additionally, the layered mineral used in the present invention should preferably be such that the interbase distance d(100) prior to contacting the organic cation is 7–13 Å due to X-ray diffraction, such as those having smectite structures, for example vermiculite, montmorillonite, beidellite, nontronite, volkonskoite, saponite and iron saponite as well as tetrasilicic mica and theniolite as swelling micas.

Conventionally, when organic cations are made to act upon layered minerals with Ae in the above-given range, if the amount of organic cations is low, then the interlayer distance normally opens up as the amount of charge of (X+Y+Z) increases between layers although the amount of organic cations is low; this is described in G. Lagaly and A. Weiss, "*Determination of the Layer Charge in Mica-type*", International Clay Conference, pp. 61–80, 1969.

When the amount of organic cations is low, the molecular conformation within the layers will be such as to conform by being continuous by single molecules parallel to the layer, but if the amount of organic cations increases, it forms a double conformation with pillar shapes formed at a uniform angle between layers. If the amount of organic cations further increases, then the area between layers wherein the organic cations are conformed in two layers or a single layer is widened when the added organic cations are conformed with some angle with respect to the layered mineral.

In this way, even when layered minerals with large amounts of charge such as mica are used as the layered minerals, at least a standard amount of an organic cation, for example a straight-chain aliphatic alkyl ammonium salt is needed in order to widen the interlayer distance. That is, a step of increasing the amount of added organic cations to open up the interlayer distance is indispensable. However, if the amount of added organic cations is increased, then much of the organic cation added to the polymer remains as residue, thus causing decreases in the heat-deformation temperature and not allowing satisfactory performance to be achieved.

Additionally, as mentioned above, in order to widen the interlayer distance of the interlayer compound prepared by bringing the organic cation into contact with the layered mineral for dispersion in a melt polymer, it is necessary to perform unlimited swelling with an organic solvent.

In order to resolve the problems of the conventional methods such as described above, the production method of the present invention disperses the layered mineral in the polymer melt by direct contact without using organic solvents, but in order to attain an environment wherein the layers of the layered mineral easily open, the method of the present invention, in addition to using layered minerals having an equivalent area per unit charge in the layer surfaces within a specified range as mentioned above, widens the interlayer distance by selecting the organic cations having steric hindrance structures in the layered minerals, thereby efficiently widening the interlayer distance even with a small quantity of organic cations.

That the organic cations have a steric hindrance structure means that the structure of the organic cations has the function of configuring with layered minerals in only a certain geometrical direction. Specifically, the organic cations should preferably have a conformation such as to be perpendicular between the bottoms of the layers with respect to the layers of the layered minerals. For example, a positively charged compound of a quaternary ammonium salt having a cage-shaped molecular structure should preferably be used. As others which conform in pillar-shapes between layers, there are aliphatic ammonium salts with amino groups present at both ends or amino alcohol derivatives having hydroxyl groups at the terminals.

When widening the interlayer distance in this manner, the present inventors succeeded in effectively widening the space between layers by using salts of azabicyclo compounds having cage-shaped structures or derivatives thereof, or by using these salts of azabicyclo compounds and derivatives thereof together with tri- or tetra-alkylammonium salts of chain-shaped amine compounds, even in small amounts, as the organic cations which conform sterically and act effectively even in small quantities.

In the present invention, examples of azabicyclo compounds which can be used as organic cations are azabicyclo[2,2,2]octane, azabicyclo[2,1,2]heptane, azabicyclo[3,2,1]octane, azabicyclo[3,2,2]nonane, azabicyclo[3,3,2]decane and azabicyclo[3,3,1]nonane, among which azabicyclo[2,2,2]octane is preferable especially from an economic standpoint as well as due to the point that it has a short synthesis route and is easily synthesized.

Particularly when using an azabicyclo compound alone as the organic cation, 4-alkylazabicyclo[2,2,2]octane ammonium salts or 4-alkylazabicyclo[2,2,2]octane ammonium salts are preferable, wherein the alkyl group at the 4-position should preferably be an aliphatic group with 4–30 carbon atoms.

Specific examples include 4-docosylazabicyclo[2,2,2]octane ammonium chloride, 4-eicosylazabicyclo[2,2,2]octane ammonium chloride, 4-octadecylazabicyclo[2,2,2]octane ammonium chloride, 4-tetradecylazabicyclo[2,2,2]octane ammonium chloride, 4-hexadecylazabicyclo[2,2,2]octane ammonium chloride, 4-dodecylazabicyclo[2,2,2]octane ammonium chloride, 4-decylazabicyclo[2,2,2]octane ammonium chloride, 4-octylazabicyclo[2,2,2]octane ammonium chloride, 4-hexylazabicyclo[2,2,2]octane ammonium chloride and 4-butylazabicyclo[2,2,2]octane ammonium chloride.

Additionally, as the above-mentioned organic cation, alkyl benzenes wherein the alkyl groups have an aliphatic group with 4–30 carbon atoms as with those described above should preferably be used. For example, there are 4-[p-docosylbenzene] azabicyclo[2,2,2]octane ammonium chloride, 4-[p-eicosylbenzene]azabicyclo[2,2,2]octane ammonium chloride, 4-[p-octadecylbenzene]azabicyclo[2,2,2]octane ammonium chloride, 4-[p-hexadecylbenzene]azabicyclo[2,2,2]octane ammonium chloride, 4-[p-tetradecylbenzene]azabicyclo[2,2,2]octane ammonium chloride, 4-[p-dodecylbenzene]azabicyclo[2,2,2] octane ammonium chloride, 4-[p-decylbenzene]azabicyclo [2,2,2] octane ammonium chloride, 4-[p-octylbenzene] azabicyclo [2,2,2]octane ammonium chloride, 4-[p-hexylbenzene] azabicyclo[2,2,2]octane ammonium chloride and 4-[p-butylbenzene]azabicyclo[2,2,2]octane ammonium chloride. Additionally, the above similarly includes 4-[m-alkylbenzene]azabicyclo[2,2,2]octane ammonium chloride.

Additionally, the chlorides can be replaced with alkyl halide compounds, for example 4-alkylbenzene azabicyclo [2,2,2] octane-N-methylammonium bromide produced by treating with methyl bromide.

Aside from the above, it is possible to use 4-alkylazabicyclochloride or, as an alternative, 4-alkylazabicyclo[2,2,2]octane-N-alkyl ammonium halides quaternized with alkyl halides.

Examples include 4-docosylazabicyclo[2,2,2]octane-N-methyl ammonium chloride, 4-[eicosyl]azabicyclo[2,2,2]octane-N-methyl ammonium chloride, 4-octadecylazabicyclo[2,2,2]octane-N-methyl ammonium chloride, 4-hexadecylazabicyclo[2,2,2]octane-N-methyl ammonium chloride, 4-tetradecylazabicyclo[2,2,2]octane-N-methyl ammonium chloride, 4-dodecylazabicyclo[2,2,2]octane-N-methyl ammonium chloride, 4-decylazabicyclo[2,2,2]octane-N-methyl ammonium chloride, 4-octylazabicyclo[2,2,2]octane-N-methyl ammonium chloride, 4-hexylazabicyclo[2,2,2]octane-N-methyl ammonium chloride and 4-butylazabicyclo[2,2,2]octane-N-methyl ammonium chloride.

Additionally, the azabicyclo compounds as described above may also have a substituent group such as an alkyl group, an alkoxy group, a p-alkylphenoxy group, an alkyl benzene group or the like at the position furthest from the nitrogen atom.

As examples of the aliphatic ammonium salt having amino groups on both terminals, there are the compounds expressed by the following rational formula.

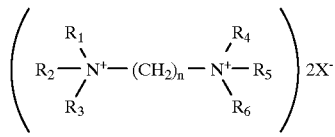

(In the formula, n is greater than or equal to 4, and $R_1$–$R_6$ are all H or $R_1$–$R_6$ may have alkyl groups. X is a halogen atom.)

As examples of amino alcohol derivatives having hydroxyl groups at the terminals, there are those expressed by the following rational formulas, wherein n is greater than or equal to 2, R is an alkyl group with 1–25 carbon atoms and X is a halogen atom.

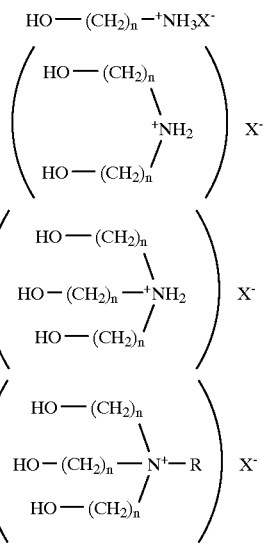

Furthermore, when used in combination with an azabicyclo compound, the straight-chain aliphatic tetra-alkyl ammonium halide should have a structure wherein at least one alkyl group has at least 4 and at most 30 carbon atoms.

For example, there are butyltrimethyl ammonium chloride, hexyltrimethyl ammonium chloride, octyltrimethyl ammonium chloride, decyltrimethyl ammonium chloride, dodecyltrimethyl ammonium chloride, tetradecyl ammonium chloride, hexadecyl ammonium chloride, octadecyl ammonium chloride, eicosyltrimethyl ammonium chloride and docosyltrimethyl ammonium chloride. Additionally, these are not restricted to straight chains, and may be isoalkyl groups, tertiary alkyl groups, or the longest alkyl group may be 2- and/or 3- substituted.

With regard to the organic cations, when the azabicyclo compounds are used singly, they should be used within a range of 0.1–150 meq/100 g, preferably 5–80 meq/100 g, and optimally 15–50 meq/100 g.

Additionally, when straight-chain aliphatic alkyl ammonium halides and cage-shaped alkyl ammonium halides are used together as are often used conventionally, the total amount used should preferably be within the range of 0.5–80 meq/100 g, but the added amount of cage-shaped alkyl ammonium halides can be 0.1–40 meq/100 g, which is economical.

The thermoplastic resin which is the base of the resin composition of the present invention may be crystalline or amorphous.

The solubility parameter of the thermoplastic resin must be at least 9.5 $[cal/cm^3]^{1/2}$, preferably at least 11.5 $[cal/cm^3]^{1/2}$, more preferably 12.5 $[cal/cm^3]^{1/2}$. By making the solubility parameter high, the polymers chemically combine with the interlayer compounds swollen by contact with the organic cations, having the function of making the area of widening the distances between the bottom surfaces of the interlayer compounds, so as to allow an environment for dispersing the interlayer compound as a filler by the layer.

The solubility parameter (SP value) is the square root of the cohesion energy, i.e. the vaporization energy per unit volume for a single molecule, and is a numerical value which indicates the magnitude of the polarity per unit volume. Since it does not evaporate in the case of a macromolecule, it is generally calculated using the formula of Small given below.

$$SP\ value = \Sigma Fi/M$$

Here, M: Unit Molecular Weight of Polymer
d: Density
Fi: Characteristic Constant of Atomic Group With regard to the method of Small, the details are described in P. A. Small, *J. Appl. Chem.*, 3, 71(1953) or *"Polymer Blends"*, pp. 127–129 (1981, published by K. K. CMC).

For the thermoplastic resin, it is possible to use, as crystalline resins, for example, aromatic polyester, aliphatic polyester, polyamide (PA) 6, polyamide 66, polyamide 11, polyamide 12, polyethylene terephthalate (PET), polybutylene terephthalate (PBT), aliphatic polyamide-imide, aromatic polyamide-imide, poly-imide, polyester imide 6, polyether ketone, polyphenylene ether (PPS) or polyoxymethylene (POM). As amorphous resins, examples include acrylonitrile styrene (AS) copolymers, acrylonitrile butadiene styrene (ABS) copolymers, polyvinyl chloride (rigid PVC), polyvinylidene chloride (PVDC), polymethamethylacrylate (PMMA), polycarbonate (PC) or polydimethylphenylene oxide (PPO). Additionally, it is also possible to use polymer alloys combining the above-mentioned resins, such as PC/PBT, PC/PA, PC/ABS, PC/PET, PPO/PBT, PPO/PA, PPO/PPS, PBT/ABS, PBT/PET, PA/ABS or PPS/PA.

In the resin composition according to the production method of the present invention, the layered minerals must be dispersed in the resin on the molecular level.

Dispersion on the molecular level in the present invention refers to a state wherein the layers of the layered minerals are separated, with the thickness of the layers primarily 80 Å or less, and they are uniformly dispersed in the resin.

Additionally, as the resin composition of the present invention, the layered minerals dispersed in the resin should preferably have the following properties (a) and (b).

(a) Thickness: 9–80 Å
(b) At least 30% by weight having an aspect ratio of 300 or more.

The thickness of the layered mineral is approximately 9 Å per layer, and 80 Å corresponds to seven layers.

The aspect ratio refers to the height/width ratio, and the present invention should preferably be such that the proportion of those wherein the ratio is at least 300 is at least 30% by weight.

Additionally, after analyzing an interlayer compound wherein the tetrasilicic mica (CM-1) to be described below as a layered mineral is intercalated with quinuclidine chloride (QC) to be described below as an organic cation at a substituted amount of 40 meq/100 g by X-ray diffraction, the results were 14.4 Å at d(001), 7.17 Å at the second layer d(002), 4.80 Å at the third layer d(003), 3.59 Å at the fourth layer d(004), 2.88 A at the fifth layer d(005) and 2.55 Å at the sixth layer d(006), thus a state of conformation was observed up to the sixth layer. However, the state of conformation cannot be observed in the second and higher layers in straight-chain aliphatic tetra-alkyl ammonium salts which have conventionally been used. Thus, it is assumed that the X-ray diffraction of the interlayer compounds of the present invention are observed to have regularity due to the organic cations perpendicularly conforming to the surfaces of the layered minerals.

EXAMPLES

Hereinbelow, the present invention will be explained in further detail by means of examples.

The flexural modulus conformed to the standards of ASTM D790. The heat deformation temperature (HDT) conformed to the standards of ASTM D648 measured under conditions of 66 psi or 246 psi. The Izod impact strength conformed to the standards of ASTM D256 measured at a temperature of 23° C. The aspect ratio was measured by using a transmission-type electron microscope on an ultrathin slice cut along the direction of flow of the extrusion mold from a test fragment using a microtome.

The dispersion was determined by measuring the thickness of the dispersed layered mineral by the above-mentioned transmission-type electron microscope, and rated in four stages.

⊚ thickness 9 to <30 Å

○ thickness 30 to <50 Å

δ thickness 50 to <80 Å x thickness 80 Å or more

The following were used as layered minerals.

CM-1: tetrasilicic mica (Ae=49, CEC=98)

CM-2: tetrasilicic mica (Ae=60, CEC=84)

CM-3: vermiculite (Ae=80, CEC=94)

CM-4: smectite (Ae=120, CEC=100)

CM-5: smectite (Ae=250, CEC=110)

CM-6: smectite (Ae=170, CEC=105)

The following were used as organic cations.

4DQC: 4-dodecylquinuclidinium chloride

QC: quinuclidinium chloride nREA: n-lauryl-N-diethanol ammonium

TMTA: N,N,N-trimethyl-N',N',N'-trimethyltetramethylene ammonium

DHDAC: dihexadodecyldimethyl ammonium chloride nRTA: n-lauryl-N-trimethyl ammonium Additionally, the eleven types shown in the following Table 1 were used as thermoplastic resins.

TABLE 1

|      | Flexural Modulus (kgf/cm$^2$) | HDT 66psi (246 psi)* | Izod 23° C. | Solubility Parameter [cal/cm$^3$]$^{1/2}$ |
|------|---|---|---|---|
| PA6  | 27,000 | (64) | 1.2 | 12.6 |
| PA66 | 29,000 | (78) | 2.2 | 13.6 |
| PP   | 16,000 | 125  | 1.0 | 8.0 |
| PS   | 33,000 | 90   | 1.2 | 9.0 |
| AS   | 36,000 | 98   | 0.7 | 12.6 |
| ABS  | 20,000 | 102  | 2.7 | 11.1 |
| PET  | 35,000 | (85) | 4.0 | 11.9 |
| PVC  | 20,000 | 60   | 0.9 | 10.3 |

TABLE 1-continued

|      | Flexural Modulus (kgf/cm$^2$) | HDT 66psi (246 psi)* | Izod 23° C. | Solubility Parameter [cal/cm$^3$]$^{1/2}$ |
|------|---|---|---|---|
| PMMA | 29,000 | 72 | 0.3 | 10.0 |
| Bionole** | 6,000 | 60 | 2.0 | 10.2 |
| POM  | 32,000 | 124 | 11.0 | 11.7 |
| PBT  | 24,000 | (59) | 5.0 | 13.8 |
| PPO  | 21,000 | (115) | 11.0 | 9.6 |

*() indicates measurement under conditions of 246 psi
**aliphatic polyester (SHOWA HIGHPOLYMER CO.LTD., Bionole #1010)

Example 1

100 g of the layered mineral (CM-1) shown in Table 2 were weighed into a beaker, immersed in distilled water, then suspended and stirred. An aqueous solution of 4DQC at 60° C. was brought into contact therewith, and the organic cations were substituted by 20 milligrams equivalent/100 g.

This suspension was cleansed, centrifugally separated, freeze-dried, then pulverized to produce an interlayer compound.

In order to confirm intercalation, the interbase distance in CM-1 was measured for d(001) using an X-ray diffraction device manufactured by RIGAKU CORPORATION., upon which the value was 9.6 Å prior to insertion of the organic cations and 38 Å after intercalation. Additionally, when thermogravimetric measurements were taken using a thermobalance device in order to confirm the amount of alkyl ammonium salts between layers, the amount of organic cations inserted between layers was approximately 5.94% of the layered mineral. Next, this layered mineral was dry-blended with PA6 using a Henschel mixer such as to be 5% by weight when converted to inorganic filler material, after which this was kneaded at 280° C. using a biaxial unidirectional extruder with a screw diameter of 30 mm and wherein the ratio LID between the screw length (L) and the screw diameter (D) was equal to 30.

Examples 2–4

As shown in Table 2, resin composition molded articles were obtained by the same method as in Example 1, with the exception that CM-2 (swollen mica obtained by fluorine treatment of talc, Example 2), CM-3 (Example 3) and CM-4 (Example 4) were used as the layered minerals.

Examples 5–9

As shown in Table 2, resin composition molded articles were obtained by the same method as in Example 1, with the exception that PA66 (Example 5), AS (Example 6), ABS (Example 7), PET (Example 8) or Bionole (Example 9) were used as the polymers.

Examples 10–15

As shown in Table 2, using QC and DHDAC as organic cations, these were sequentially added and intercalated, resulting in an interlayer compound with a d(001) value of 38 upon X-ray diffraction. This interlayer compound was tumbler-blended with PA6 (Example 10, Example 15), AS (Example 11), PET (Example 12), PVC (Example 13) or PMMA (Example 14), then kneaded by a biaxial unidirectional extruder. The resulting resin composition was molded by an extrusion molder to obtain a resin composition molded article.

Example 16

With Example 1, an interlayer compound was prepared wherein the organic cation was nREA, and the ion exchange quantity was 18 meq/100 g, then this was kneaded with PA6. Otherwise, a resin composition molded article was obtained in the same manner as with Example 1.

Example 17

With Example 1, an interlayer compound was prepared wherein the organic cation was TMTA, and the ion exchange quantity was 40 meq/100 g, then this was kneaded with PA6. Otherwise, a resin composition molded article was obtained in the same manner as with Example 1.

Examples 18–20

As shown in Table 2, molded articles were obtained in the same manner as with Example 1 with the exception that POM (Example 18), PBT (Example 19) and PPO (Example 20) were used as polymers.

TABLE 2

|  | Layered Mineral | Organic Cation Type | Exch. (meq/100 g) | Resin | Composition (% by wt.) Layered Mineral | Organic Cation | Resin | Solvent During Blend |
|---|---|---|---|---|---|---|---|---|
| Ex. 1 | CM-1 | 4DQC | 20 | PA6 | 5 | 0.29 | 94.71 | NONE |
| Ex. 2 | CM-2 | 4DQC | 20 | PA6 | 5 | 0.29 | 94.71 | NONE |
| Ex. 3 | CM-3 | 4DQC | 20 | PA6 | 5 | 0.29 | 94.71 | NONE |
| Ex. 4 | CM-4 | 4DQC | 20 | PA6 | 5 | 0.29 | 94.71 | NONE |
| Ex. 5 | CM-1 | 4DQC | 20 | PA66 | 5 | 0.29 | 94.71 | NONE |
| Ex. 6 | CM-1 | 4DQC | 20 | AS | 5 | 0.29 | 94.71 | NONE |
| Ex. 7 | CM-1 | 4DQC | 20 | ABS | 5 | 0.29 | 94.71 | NONE |
| Ex. 8 | CM-1 | 4DQC | 20 | PET | 5 | 0.29 | 94.71 | NONE |
| Ex. 9 | CM-1 | 4DQC | 20 | Bion. | 5 | 0.29 | 94.71 | NONE |
| Ex. 10 | CM-1 | QC(A) + DHDAC(B) | (A)0.5 (B)45 | PA6 | 5 | 1.36 | 94.64 | NONE |
| Ex. 11 | CM-2 | QC(A) + DHDAC(B) | (A)0.5 (B)45 | AS | 5 | 1.36 | 94.64 | NONE |
| Ex. 12 | CM-2 | QC(A) + DHDAC(B) | (A)0.5 (B)45 | PET | 5 | 1.36 | 94.64 | NONE |
| Ex. 13 | CM-2 | QC(A) + DHDAC(B) | (A)2 (B)30 | PVC | 5 | 1.42 | 93.58 | NONE |
| Ex. 14 | CM-2 | QC(A) + DHDAC(B) | (A)2 (B)25 | PMMA | 5 | 1.28 | 93.72 | NONE |
| Ex. 15 | CM-2 | TMTA | (A)0.1 (B)45 | PA6 | 5 | 1.3 | 93.70 | NONE |
| Ex. 16 | CM-1 | TMTA | 18 | PA6 | 5 | 1.14 | 93.86 | NONE |
| Ex. 17 | CM-1 | QC(A) + DHDAC(B) | 40 | PA6 | 5 | 0.35 | 94.65 | NONE |
| Ex. 18 | CM-1 | 4DQC | 20 | POM | 5 | 0.29 | 94.71 | NONE |
| Ex. 19 | CM-1 | 4DQC | 20 | PBT | 5 | 0.29 | 94.71 | NONE |
| Ex. 20 | CM-1 | 4DQC | 20 | PPO | 5 | 0.29 | 94.71 | NONE |

With regard to the resin composition molded articles obtained by the above-mentioned examples 1–17, the flexural modulus, heat deformation temperature (HDT), Izod impact strength, aspect ratio and dispersion state were observed; the results are shown in Table 3.

TABLE 3

|  | FLEXURAL MODULUS (kgf/cm$^2$) | HDT 66 psi (246 psi)* | IZOD 23° C. | PROP. ASPECT RATIO ≥ 300 (% by wt.) | DISPERSION STATE |
|---|---|---|---|---|---|
| Ex. 1 | 46,000 | (128) | 2.5 | 70 | ⊚ |
| Ex. 2 | 45,600 | (119) | 2.3 | 68 | ⊚ |
| Ex. 3 | 44,500 | (110) | 2.1 | 66 | ⊚ |
| Ex. 4 | 36,000 | (103) | 1.6 | 43 | ⊚ |
| Ex. 5 | 44,000 | (140) | 2.1 | 60 | ⊚ |
| Ex. 6 | 44,000 | 100 | 0.8 | 39 | ○ |
| Ex. 7 | 39,000 | 104 | 10.0 | 41 | ○ |
| Ex. 8 | 41,000 | (81) | 4.1 | 60 | Δ |
| Ex. 9 | 16,000 | 97 | 8.0 | 35 | Δ |
| Ex. 10 | 45,000 | (118) | 2.3 | 44 | ⊚ |
| Ex. 11 | 45,600 | 100 | 2.3 | 46 | ○ |
| Ex. 12 | 41,700 | 81 | 2.0 | 49 | ○ |

TABLE 3-continued

|  | FLEXURAL MODULUS (kgf/cm$^2$) | HDT 66 psi (246 psi)* | IZOD 23° C. | PROP. ASPECT RATIO ≧ 300 (% by wt.) | DISPERSION STATE |
|---|---|---|---|---|---|
| Ex. 13 | 48,000 | 79 | 1.1 | 80 | ○ |
| Ex. 14 | 43,000 | 80 | 1.9 | 36 | ○ |
| Ex. 15 | 44,430 | (120) | 2.1 | 56 | ○ |
| Ex. 16 | 47,000 | (125) | 2.0 | 48 | ◎ |
| Ex. 17 | 40,000 | (100) | 1.7 | 34 | ◎ |
| Ex. 18 | 55,000 | 124 | 8.0 | 48 | ◎ |
| Ex. 19 | 45,600 | (120) | 4.0 | 53 | ◎ |
| Ex. 20 | 41,000 | (118) | 8.0 | 36 | Δ |

*( ) indicates measurement at 246 psi.

All of the resin composition molded articles obtained in Examples 1–4 had layered minerals with good states of dispersion, and with exceptional rigidity, heat resistance and impact resistance in comparison to PA6 shown in Table 1.

As shown by the results of Examples 5–9, layered minerals can be dispersed on the molecular level without using organic solvents, by using thermoplastic resins with solubility parameters of at least 9.5 [cal/cm$^3$]$^{1/2}$ and layered minerals wherein the equivalent area per unit charge in the layer surface is 40–150 Å$^2$/charge.

As shown by the results of Examples 10–15, the combined addition of a small amount of quinuclidine and straight-chain aliphatic tetra-alkyl ammonium salts clearly improves the heat resistance and increases the nanometer level dispersion with a small amount of organic cations.

Upon measuring the interlayer distance d(001) of the resin composition molded article obtained in Example 16 by X-ray diffraction, the interlayer distance was 18 Å after insertion of the organic cations, from which it is surmised that the diethanol conforms in pillar-shapes between the layers and the lauryl groups conform in parallel between the layers.

Upon measuring the interlayer distance d(001) of the resin composition molded article obtained in Example 17 by X-ray diffraction, the interlayer distance was 16 Å after insertion of the organic cations, from which it is surmised that there is a roughly pillar-shaped conformation between the layers.

Comparative Example 1

As shown in Table 4, a resin composition molded article was prepared in the same manner as with Example 1, with the exception that CM-5 which has a high equivalent area per unit charge on the layer surface was used as the layered mineral.

The results of observations of the flexural modulus, heat deformation temperature (HDT), Izod impact strength, aspect ratio and dispersion state of this molded article are shown in Table 5.

Comparative Example 2

Unlimited swelling was performed on an interlayer compound obtained in the same manner as Comparative Example 1 by adding toluene in a proportion of 10% by weight, and injection dispersion was performed while kneading this by means of a plunger pump from the side surface of the extruder. The resulting resin composition was molded by means of an extrusion molder to obtain a resin composition molded article.

Comparative Example 3

As shown in Table 4, a resin composition molded article was obtained in the same manner as Example 1, with the exception that DHDAC was used as an organic cation.

Comparative Examples 4 and 5

As shown in Table 4, resin composition molded articles were obtained in the same manner as with Example 1, with the exception that DHDAC was used as the organic cation and the ion exchange amount was 50 meq/100 g (Comparative Example 4), and that DHDAC was used as the organic cation and the ion exchange amount was 98 meq/100 g (Comparative Example 5).

Comparative Example 6

As shown in Table 4, QC was used as the organic cation, which was intercalated in tetrasilicic mica such that the ion exchange amount was 0.05 meq/100 g, and dehydration drying was performed, after which it was confirmed whether a standard amount was inserted between the layers by means of a thermobalance. Next, the DHDAC was dissolved in water, and intercalation was performed as above. When the amount of the quinuclidine chloride portion was subtracted from the thermobalance, the ion exchange amount of the DHDAC was 95 meq/100 g. Otherwise, kneading and extrusion was performed in the same manner as with Example 1, to obtain a resin composition molded article.

Comparative Examples 7 and 8

As shown in Table 4, resin composition molded articles were prepared in the same manner as with Example 1, with the exception that PP (Comparative Example 7) and PS (Comparative Example 8) were used as polymer having solubility parameters of less than 9.5 [cal/cm$^3$]$^{1/2}$.

Comparative Example 9

As shown in Table 4, a resin composition molded article was obtained in the same manner as with Example 4, with the exception with CM-6 was used as the layered mineral.

Comparative Example 10

As shown in Table 4, a blend was performed in the same manner as Example 9 with the exception that xylene was added as an organic solvent to form an unlimited swelling slurry of 10% by weight, then this was injected in standard amounts from the side surface of the extruder during kneading, and a resin composition was obtained by dispersive kneading, then this was used to produce a resin composition molded article.

Comparative Example 11

As shown in Table 4, the amount of the organic cation was increased, PP was used as a polymer, and xylene was used as a solvent to produce a 10% by weight solution by unlimited swelling of the interlayer compounds, then this was injected by fixed amounts from the side surface of an extruder by a plunger pump such that the layered mineral was 5% by weight. Otherwise, the resin composition molded article was prepared in the same manner as Example 1.

Comparative Example 12

A resin composition molded article was obtained in the same manner as Example 16, with the exception that the organic cation was nRTA and the ion exchange amount was 20 meq/100 g.

TABLE 4

| | Layered Mineral | Organic Cation Type | Exch. (meq/100 g) | Resin | Composition (% by wt.) Layered Mineral | Organic Cation | Resin | Solvent During Blend |
|---|---|---|---|---|---|---|---|---|
| Comp. Ex. 1 | CM-5 | 4DQC | 20 | PA6 | 5 | 0.28 | 94.72 | NONE |
| Comp. Ex. 2 | CM-5 | 4DQC | 20 | PA6 | 5 | 0.28 | 94.72 | Toluene |
| Comp. Ex. 3 | CM-1 | DHDAC | 20 | PA6 | 5 | 0.28 | 94.72 | NONE |
| Comp. Ex. 4 | CM-1 | DHDAC | 50 | PA6 | 5 | 2.59 | 92.41 | NONE |
| Comp. Ex. 5 | CM-1 | DHDAC | 98 | PA6 | 5 | 4.6 | 90.4 | NONE |
| Comp. Ex. 6 | CM-2 | QC(A) + DHDAC(B) | (A)0.05 (B)95 | PA6 | 5 | 4.6 | 90.4 | NONE |
| Comp. Ex. 7 | CM-1 | 4DQC | 20 | PP | 5 | 0.28 | 94.72 | NONE |
| Comp. Ex. 8 | CM-1 | 4DQC | 20 | PS | 5 | 0.28 | 94.72 | NONE |
| Comp. Ex. 9 | CM-6 | 4DQC | 45 | PA6 | 5 | 0.63 | 94.37 | NONE |
| Comp. Ex. 10 | CM-6 | 4DQC | 45 | PA6 | 5 | 0.63 | 94.37 | Xylene |
| Comp. Ex. 11 | CM-1 | 4DQC | 45 | PP | 5 | 0.63 | 94.37 | Xylene |
| Comp. Ex. 12 | CM-1 | nRTA | 45 | PA6 | 5 | 0.23 | 94.77 | NONE |

The flexural modulus, heat distortion temperature (HDT), Izod impact strength, aspect ratio and dispersion state of the resin composition molded articles obtained in the above Comparative Examples 2–12 were observed, and the results are shown in Table 5.

TABLE 5

| | FLEXURAL MODULUS (kgf/cm$^2$) | HDT 66 psi (246 psi)* | IZOD 23° C. | PROP. ASPECT RATIO ≧ 300 (% by wt.) | DISPERSION STATE |
|---|---|---|---|---|---|
| Comp. Ex. 1 | 29,000 | (78) | 1.7 | 10 | x |
| Comp. Ex. 2 | 30,000 | (80) | 1.8 | 26 | x |
| Comp. Ex. 3 | 29,800 | (82) | 1.8 | 20 | x |
| Comp. Ex. 4 | 33,000 | (66) | 2.0 | 23 | x |
| Comp. Ex. 5 | 36,000 | (60) | 2.1 | 19 | x |
| Comp. Ex. 6 | 35,600 | (70) | 1.9 | 28 | x |
| Comp. Ex. 7 | 22,000 | 130 | 2.0 | 4 | x |
| Comp. Ex. 8 | 30,000 | 100 | 2.4 | 5 | x |
| Comp. Ex. 9 | 31,000 | (81) | 1.5 | 22 | x |
| Comp. Ex. 10 | 32,000 | (82) | 1.6 | 28 | x |
| Comp. Ex. 11 | 19,000 | 120 | 2.6 | 27 | x |
| Comp. Ex. 12 | 29,000 | 130 | 1.8 | 29 | x |

*( ) indicates measurement at 246 psi

Upon observing the state of dispersion of the resin composition obtained by Comparative Example 1 by means of a transmission-type electron microscope, the thickness of the layered mineral was 600 Å at minimum. Additionally, while the flexural modulus was 29,000 kg/cm$^2$, the heat resistance was 78° C. at 246 psi, thus the heat resistance was extremely low. Additionally, when the thicknesses of the layers were observed by a transmission-type electron microscope, the minimum thickness of the layers was equivalent to 200 layers in most, so that the self-destruction due to the organic cations was low and the dispersion was poor.

The resin composition obtained in Comparative Example 2 had a flexural modulus of 30,000 kg/cm$^2$, but observations by a transmission-type electron microscope revealed that the thickness of the layered mineral was 400 Å at minimum; thus, although the dispersion was improved, the heat resistance and rigidity both did not attain the levels of the resin composition obtained by Example 1.

The resin composition obtained by Comparative Example 3 had poor dispersion, and observations by a transmission-type electron microscope revealed the minimum layer thickness with the interlayer compound dispersed was 2000 Å, which is inadequate dispersion. Additionally, the mechanical properties were also insufficient.

With the resin composition of Comparative Example 4, the dispersion was improved, but there was a marked reduction in the heat resistance due to the large amount of organic cations.

The heat resistance of the resin composition of Comparative Example 5 was 60° C. at 246 psi, and the flexural modulus and Izod impact strength both exhibited poor performance. When the state of dispersion within the resin composition was observed by a transmission-type electron microscope, the minimum thickness of the layered mineral was 2,000 Å, so that the dispersion was also inadequate.

The flexural modulus of the resin composition of Comparative Example 6 was 35,600 kg/cm$^2$, and the heat resistance was extremely low even at conditions of 246 psi of the HDT. Consequently, even if a layered mineral having a small equivalent area per unit charge on the layer surface is used, dispersion is difficult unless at least a prescribed amount of an organic cation having a steric hindrance structure is added. Additionally, under the conditions of Comparative Example 6, the heat resistance of the obtained resin composition is believed to have become worse because the amount of conventionally known organic cations was large.

With the resin compositions of Comparative Example 7 and Comparative Example 8, the mechanical properties were poor, and the minimum thickness of the minerals in the dispersion layer as observed by a transmission-type electron microscope was 2,500 Å; thus the dispersion was extremely poor.

The resin composition of Comparative Example 9 was insufficient in both rigidity and heat resistance. By using a layered mineral with a large equivalent area per unit charge in the layer surface, the dispersion is not adequate even when PA6 is used.

With the resin composition of Comparative Example 10, the degree of dispersion was slightly improved over the resin composition obtained in Comparative Example 9. Therefore, in the case of a layered mineral with a large equivalent area per unit charge in the layer surface, dispersion is difficult without the aid of an organic solvent. Additionally, although the resin composition molded articles obtained in Comparative Example 9 and Comparative Example 10 both had low heat resistance, this is believed to be because the crystal size of synthetic smectite is small.

With the resin composition of Comparative Example 11, the filler absolutely failed to disperse on the nano-level. This is believed to be because the solubility parameter of this polymer was low, so that the melted polymer did not conform to a swollen interlayer compound, and subsequent shear did not cause peeling between layers.

The interlayer distance d(001) of the resin composition molded article obtained by Comparative Example 12 as measured by X-ray diffraction was such that the interlayer distance after insertion of the organic cations was 20 Å; thus the dispersion was poor.

From the above results, it is clear that the resin compositions obtained by the above-described examples have superior mechanical properties and higher heat deformation temperatures than the resins of the above-described comparative examples and of Table 1. Additionally, in all of the resin compositions obtained by the above-described comparative examples, the state of dispersion of the inorganic filler was poor.

INDUSTRIAL APPLICABILITY

According to the method of producing a resin composition containing an inorganic filler of the present invention, the enclosure of the terminal groups as is required in conventional polymerization methods is not needed, and organic solvents are unnecessary, so that the process can be simplified and the production costs can be lowered. Additionally, it is possible to use a larger variety of resins in comparison to the conventional polymerization methods or organic solvent methods, so that it can be used for a variety of purposes.

Additionally, when forming a polymer alloy, the adhesive strength of the resin surface does not decrease, so that the dispersion phase will not become un-mixed, the phase becomes stable, and a wide range of dispersion mixtures is possible.

Additionally, by selecting organic cations having structures which conform perpendicularly to the layered mineral, the interlayer distance is efficiently spread with only a small amount of organic cations, so that reductions in the heat resistance of the produced resin compositions do not occur.

Therefore, according to the present invention, inorganic fillers can be finely dispersed at the molecular level directly into resin compositions, thereby producing resin compositions containing inorganic fillers having exceptional rigidity, heat resistance and impact resistance, which are suitable for applications in fields such as, for example, automobiles, household electronic parts, construction materials and industrial materials.

We claim:

1. A method of producing a resin composition containing an inorganic filler comprising contacting an organic cation having a steric hindrance structure with a layered mineral with an equivalent area per unit charge on the layer surface of 40–150 Å$^2$/charge, and then contacting with a thermoplastic resin having a solubility parameter of at least 9.5 (cal/cm$^3$)$^{1/2}$, so as to disperse the disperse the layered mineral inside said resin at the molecular level, wherein the organic cation is one compound selected from the group consisting of salts of an azabicyclo compound, aliphatic ammonium salts having amino groups on both terminals and amino alcohol compounds having hydroxyl groups at the terminals.

2. A method of producing a resin composition containing an inorganic filler in accordance with claim 1, wherein the layered mineral dispersed in the resin has the following properties (a) and (b):

(a) thickness: 9–80 Å;

(b) at least 30% by weight having an aspect ratio of at least 300.

3. A method of producing a resin composition containing an inorganic filler in accordance with either claim 1 or 2, wherein the method comprises contacting the layered mineral which is brought into contact with the organic cation with a thermoplastic resin in a melted state without the presence of a solvent.

4. A method of producing a resin composition containing an inorganic filler in accordance with either claim 1 or 2, wherein the interbase distance d(001) of the layered mineral is 7–13 Å.

5. A method of producing a resin composition containing an inorganic filler in accordance with either claim 1 or 2, wherein the organic cation is a salt of an azabicyclo compound.

6. A method of producing a resin composition containing an inorganic filler according to claim 5, wherein the organic cation also comprises a tri- or tetra-alkyl ammonium salt of an amine compound, wherein said alkyl moiety is a straight chain or branched chain moiety.

7. A method of producing a resin composition containing an inorganic filler in accordance with claim 5, wherein said salt of an azabicyclo compound is added in a range of 0.1–150 meq/100 g.

* * * * *